United States Patent
Nakadaira (10) Patent No.: US 7,139,089 B2
(45) Date of Patent: Nov. 21, 2006

(54) MULTIFUNCTIONAL PRINTER AND METHOD FOR DISPLAYING IMAGE DATA TO BE TRANSMITTED

(75) Inventor: Hidemi Nakadaira, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 772 days.

(21) Appl. No.: 10/314,224

(22) Filed: Dec. 9, 2002

(65) Prior Publication Data

US 2003/0169447 A1 Sep. 11, 2003

(30) Foreign Application Priority Data

Mar. 6, 2002 (JP) ............................. 2002-060549

(51) Int. Cl.
*G06F 3/12* (2006.01)
(52) U.S. Cl. ................... 358/1.15; 358/1.14; 358/1.19; 358/488
(58) Field of Classification Search ............... 358/1.15, 358/488, 1.14, 1.19
See application file for complete search history.

(56) References Cited

U.S. PATENT DOCUMENTS

| | | | | |
|---|---|---|---|---|
| 5,832,298 | A * | 11/1998 | Sanchez et al. | 710/8 |
| 6,222,545 | B1 * | 4/2001 | Suzuki et al. | 345/418 |
| 6,692,167 | B1 * | 2/2004 | Nakadaira et al. | 400/61 |
| 6,697,091 | B1 * | 2/2004 | Rzepkowski et al. | 715/835 |
| 2002/0054364 | A1 * | 5/2002 | Asahi | 358/403 |

* cited by examiner

*Primary Examiner*—Kimberly Williams
*Assistant Examiner*—Andrew Lam
(74) *Attorney, Agent, or Firm*—Greenblum & Bernstein, P.L.C.

(57) ABSTRACT

At a predetermined location on a touch panel, a document image in a portrait direction, or a document image in a landscape direction is displayed according to a direction of the scanned document, while displaying a corresponding forwarding image in parallel, on the same screen. Since the direction of the scanning document and the direction of the document at the destination are displayed, it is possible to easily confirm how the scanning image is forwarded to the destination, thereby preventing an error of forwarding the document with the wrong direction.

16 Claims, 9 Drawing Sheets

MULTIFUNCTIONAL PRINTER AND METHOD FOR DISPLAYING IMAGE DATA TO BE TRANSMITTED

BACKGROUND OF THE INVENTION

1. Field of the Invention

The present invention relates to a multifunctional printer with a scanner function, and a method for displaying image data to be transmitted, using the multifunctional printer.

2. Description of Related Art

In recent years, multifunctional printers having printer/facsimile functions added to copiers are becoming very popular. In addition to the printer/facsimile functions, scanner functions have been added to some multifunctional printers.

However, the conventional technology has the following problem. When a direction of a transmitting document and the one of recording paper are different for facsimile transmission, the image is rotated in order to match the directions of the transmitting document and recording paper. This is performed by determining whether the directions of the transmitting document and recording paper are matched, regardless of the direction of an image on the transmitting document. When using a scanner function, it is more important to match the directions of the image on the transmitting document and the image on a personal computer, rather than matching the directions of the transmitting document and recording paper. In particular, there is a concern that the scanned image by the scanner will become captured with the wrong direction by the personal computer, when a user does not know which direction the scanned image will be displayed on the screen of the personal computer. Therefore, such user has to repeat making some mistakes until the image is captured with the right direction, thereby creating quite a cumbersome procedure.

In addition, for facsimile transmission, a destination can be pre-registered in a one-touch key or the like, or the number for a destination can be manually input using numeric keys. In contrast, when using a scanner, it is more convenient to have an address of a personal computer pre-registered, instead of manually inputting the personal computer address using the numeric keys, since the scanned image is forwarded to a specified personal computer address. However, there is a limitation of the number of addresses that can be pre-registered.

SUMMARY OF THE INVENTION

The present invention addresses the above-described problems. The purpose of this invention is to provide a multifunctional printer and a control method for a display apparatus of the multifunctional printer that can capture an image with an appropriate direction by preventing user's misconception, upon scanning an image, and can increase the number of registering destinations as much as possible.

In order to solve the above-described problems, the present invention provides a scanner that scans a document, a forwarding unit that forwards an image of the document to a specified destination, a display that displays a document image illustrating a direction of the document scanned by the scanner and a forwarding image illustrating a direction of the document at the destination, and a controller that allows the display to display the document image and forwarding image that is matched in accordance with the direction of the document image scanned by the scanner.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiment of the present invention is explained in the following, in reference to the above-described drawings.

Figure 1:
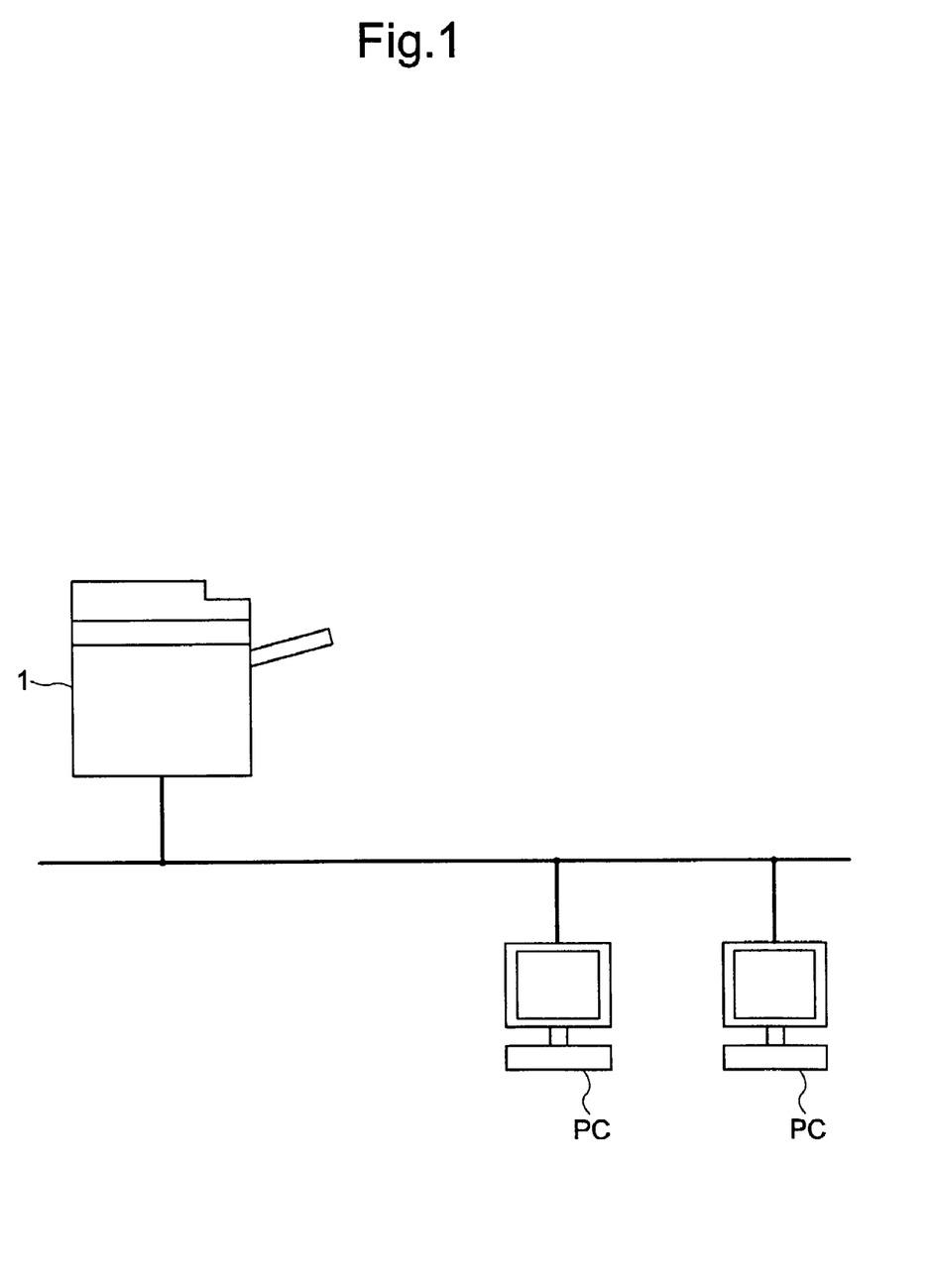
FIG. 1 is a schematic view illustrating a multifunctional printer according to the embodiment of the present invention and a plurality of personal computers that are mutually connected via a LAN.

FIG. 1 is a schematic view illustrating a state where multifunctional printer 1 according to the embodiment of the present invention and a plurality of personal computers (PCs) are mutually connected via a LAN. Accordingly, one multifunctional printer 1 and a plurality of PCs can mutually exchange signals. Multifunctional printer 1 has copier, printer, facsimile, and scanner functions. It is not necessary to have the entire functions, however, the multifunctional printer 1 according to the embodiment of the present invention has at least a scanner function in the following illustration.

Figure 2:
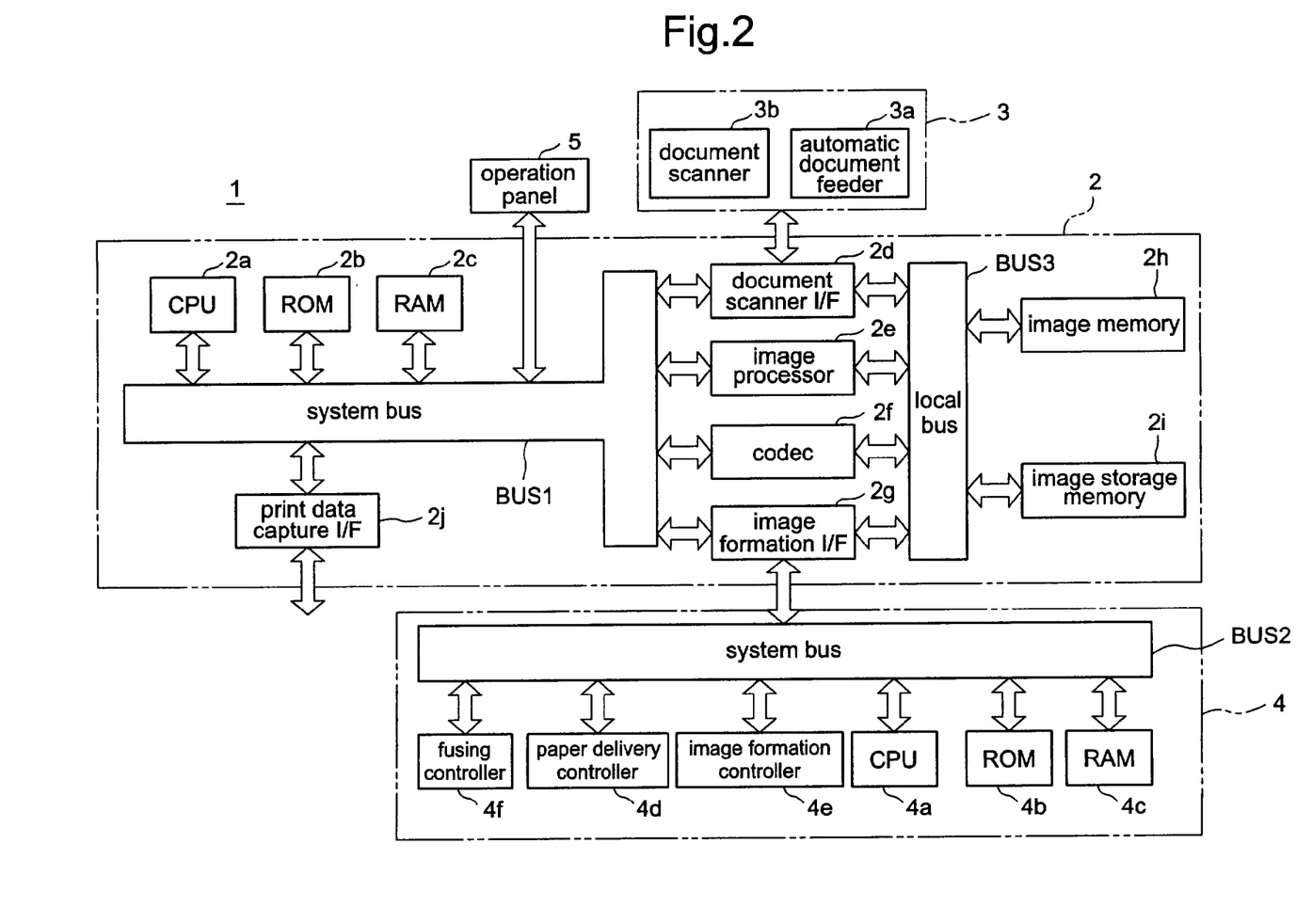
FIG. 2 is a block diagram illustrating a control of the multifunctional according to the embodiment of the present invention.

FIG. 2 is a block diagram illustrating the functions of multifunctional printer 1. Multifunctional printer 1 includes central processing apparatus 2 that is a forwarding/controlling unit and controls the entire multifunctional printer, document scanning controller 3 that scans a document, image formation unit 4 that forms an image on recording paper, and control panel 5 that is a display unit/apparatus and an input/output unit for an operator.

Central control apparatus 2 includes CPU 2a, ROM 2b, and RAM 2c, all of which mutually exchange signals via system bus BUS1. ROM 2b stores an operational program of CPU 2a, while RAM 2c stores work area and the like of CPU 2a.

Document scanning controller 3 includes automatic document feeder 3a that automatically feeds a document, and document scanner 3b. In addition, image formation unit 4 has CPU 4a, ROM 4b, and RAM 4c, all of which mutually exchange signals via system bus BUS2. Image formation unit 4 also includes paper delivery controller 4d that delivers paper retrieved from a paper tray, image formation controller 4e that forms an image, and fusing controller 4f that controls toner fusing.

Within central processing apparatus 2, document scanner interface (I/F) 2d, image processor 2e, codec 2f, and image formation I/F 2g are connected to system bus BUS1. Document scanner I/F 2d connects document scanning controller 3 and system bus BUS1, and edits the scanned image data. Image processor 2e is an image processing circuit that enlarges/reduces the size of image data and/or rotates the data at an arbitrary degree. Codec 2f performs encoding/decoding processes on image data. Image formation I/F 2g exchanges image data of recording image between central processing apparatus 1 and image formation unit 4.

These document scanning I/F 2d, image processor 2e, codec 2f, and image formation I/F 2g are connected to image memory 2h and image storage memory 2i via local bus BUS3. Image memory 2h stores image data encoded by codec 2f. Further, print data capturer I/F 2j is connected to system bus BUS1. This print data capturer I/F 2j exchanges print data with a PC via the LAN.

Next, a scanning process of multifunctional printer 1 is illustrated as follows. In this scanning process, a document is set in multifunctional printer 1, and the scanned image is transmitted to a specified destination PC. As illustrated in a flowchart of FIG. 3, a destination process is performed at first in order to select a transmitting destination of an image at step ST1. This destination process is illustrated using a flowchart of FIG. 4. In this state, touch panel 6, which is included in the above-described operation panel 5, displays a destination screen as a first screen illustrated in FIG. 5.

Figure 4:
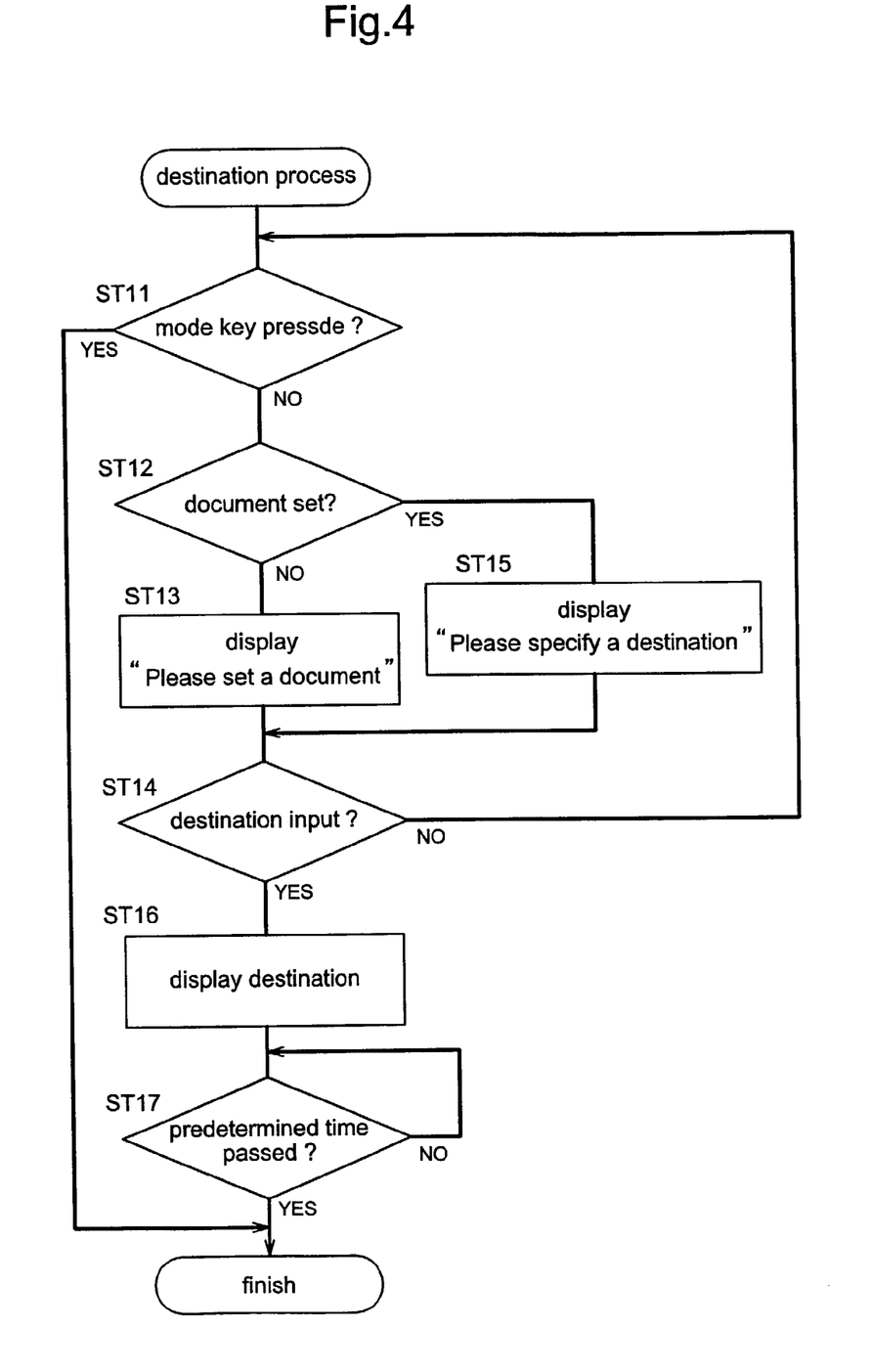
FIG. 4 is a flowchart illustrating a destination process.

It is checked whether mode key 11 is pressed at step ST11 of FIG. 4. This mode key 11 switches between a destination process mode and a document display process mode. When mode key 11 is pressed at step ST11, selecting not to perform the destination process mode, the flow is terminated. When mode key 11 is not pressed at step ST11, the control proceeds to step ST12.

At step ST12, it is checked whether a document is set. A location sensor used for copiers and the like can perform this process. When it is determined that a document is not set at step ST12, the control proceeds to step ST13, where a message "please set a document" is displayed, and proceeds to step ST14. When it is determined that a document is set at step ST12, the control proceeds to step ST15, where a message "please specify a destination" is displayed, and proceeds to step ST14.

At step ST14, it is checked whether a destination is input. The destination input process can be performed, for example, from the destination screen as the first screen shown in FIG. 5, by pressing a desired tag 12, which is in the alphabetical order, and by pressing a desired destination specifying key 13, among the screen of a plurality of destination specifying keys 13 corresponding to the chosen tag 12.

Figure 5:
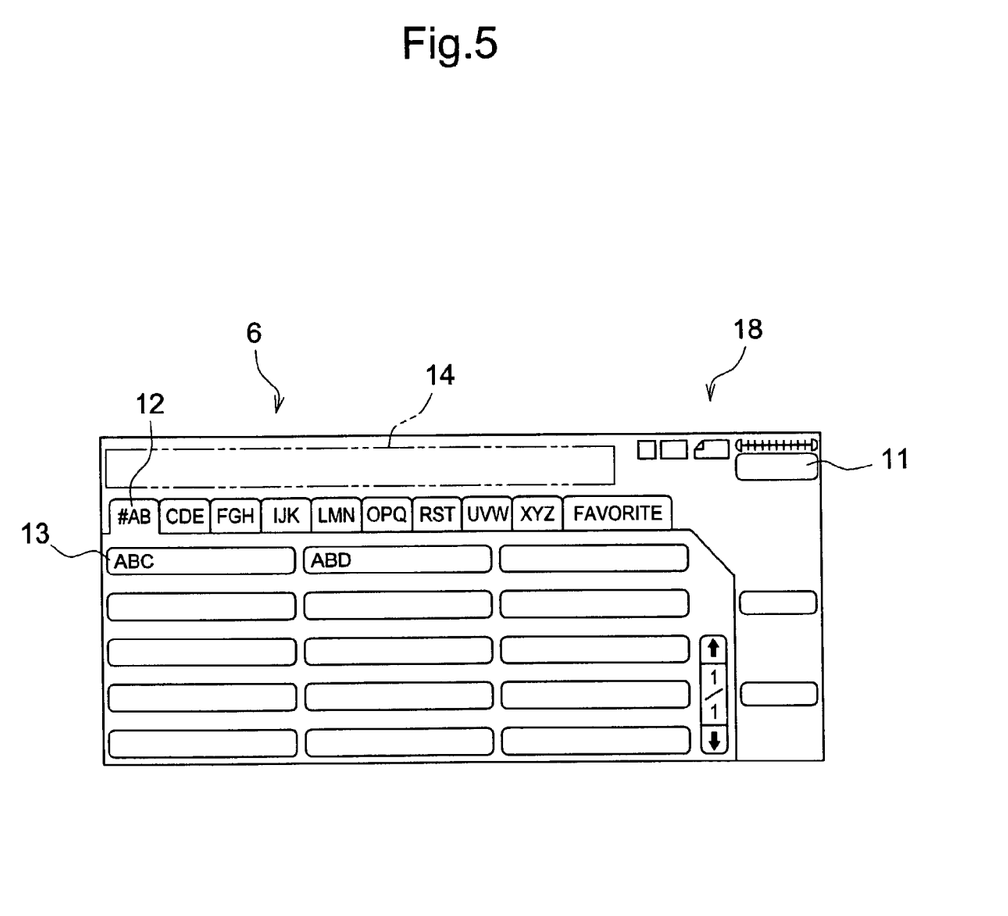
FIG. 5 illustrates a destination screen.

The destination screen of FIG. 5 can be switched to display a document direction display screen as the second screen. Accordingly, it is possible to display as many destinations as possible, using almost the entire display of touch panel 6. In the example shown in FIG. 5, twelve destinations in a 4×3 format are displayed at once. Since there are many destinations displayed at once, it is easy to specify a destination. Especially, since multifunctional printer 1 are used on a network where many PCs are connected, it is possible to effectively select a destination in order to forward a scanned image by a scanner.

While it is being determined that there is no destination input at step ST14 (no destination is selected), the control returns to step ST11 to repeat steps ST11–14. When it is determined that a destination is input, the control proceeds to step ST16 to display the selected destination. The destination can be displayed on information display area 14, for example.

At the following step ST17, it is checked whether a predetermined time has passed. When the predetermined time has passed, the destination process mode is completed. The predetermined time is used to visually recognize the destination selected by the user.

Figure 3:
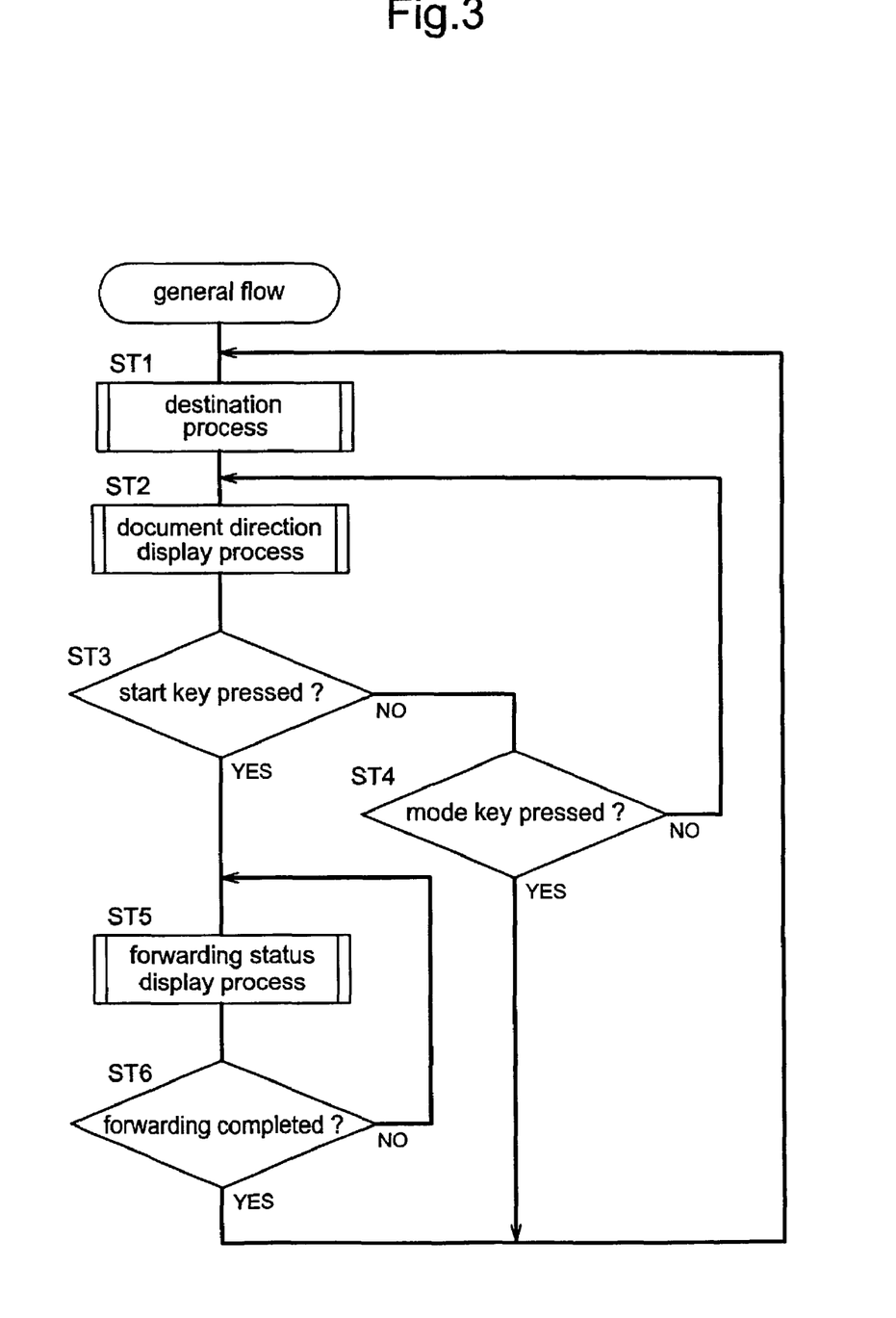
FIG. 3 is a flowchart illustrating a control based on the present invention.
Figure 6:
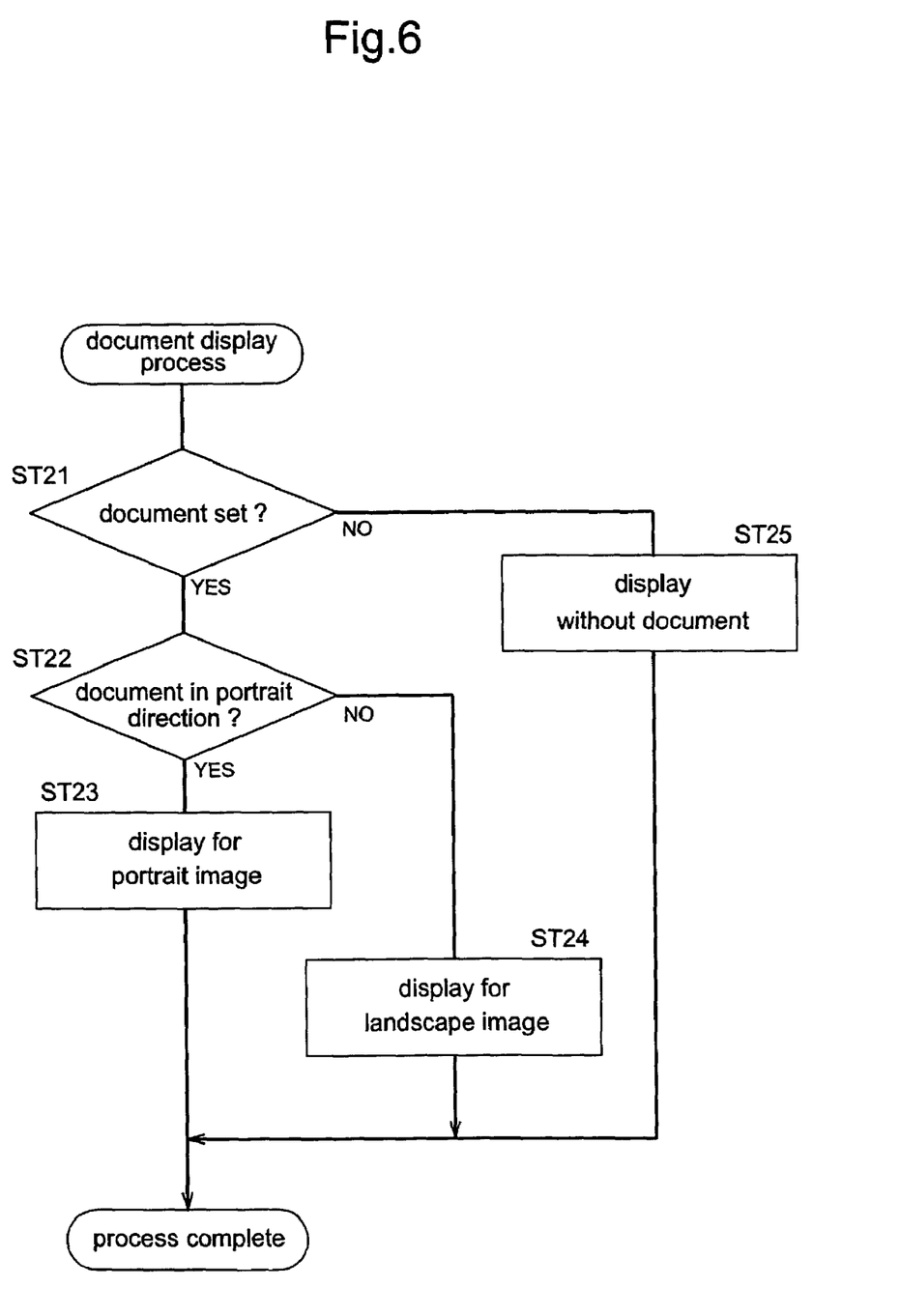
FIG. 6 is a flowchart illustrating a document display process.

When the destination process is completed, the control proceeds to step ST2 of FIG. 3, in order to perform a document display process mode. The document display process is illustrated as follows, using a flowchart of FIG. 6. First, at step ST21 of FIG. 6, it is checked whether a document is set. When it is determined that a document is set, the control proceeds to step ST22 to check whether the document is in a portrait direction. When the document is in the portrait direction, the control proceeds to step ST23. At step ST23, touch panel 6 displays a document direction display screen as the second screen illustrated in FIG. 7(a). At a predetermined location of the document direction display screen, document image 15a indicating a portrait direction is displayed, while displaying forwarding image 17a indicating a portrait direction in parallel on the same screen, which completes the document direction display process.

Figure 7B:
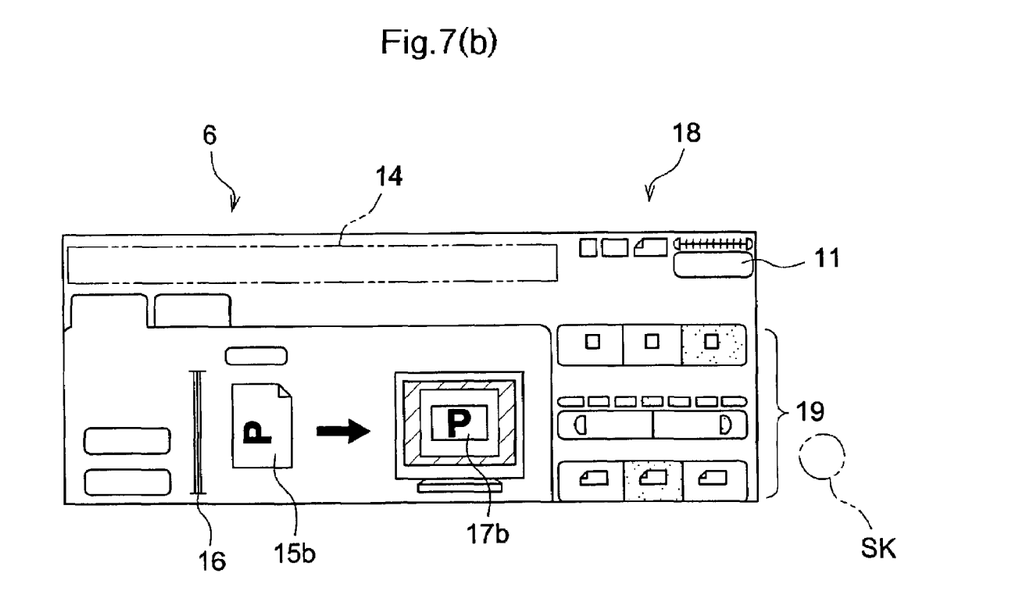
FIG. 7(b) illustrates a display for scanning a document in a landscape direction.
Figure 8:
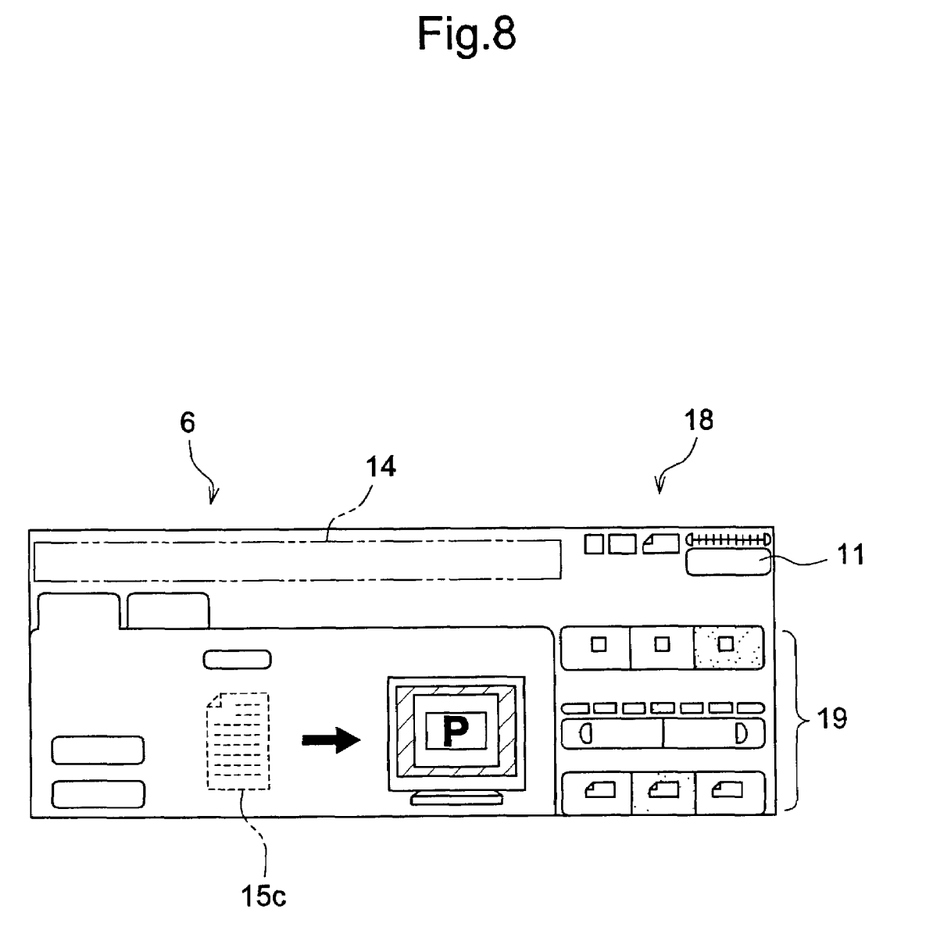
FIG. 8 illustrates a state where the document is missing in accordance with FIG. 7(a)

When it is determined the document is not in a portrait direction at step ST22, the control proceeds to step ST24, since it indicates that the document is in a landscape direction. At step ST24, at a predetermined location in touch panel 6 illustrated in FIG. 7(b), document image 15b and forwarding image 17b indicating a landscape direction are displayed, which completes the document direction display process. Also, when it is determined that a document is not set at step ST21, the control proceeds to step ST25, to display missing document image 15c indicating the missing document in gray color as illustrated in FIG. 8, which completes the document display process.

Accordingly, since the display is performed by matching the display with the document direction prior to a transmission, it is possible to prevent a situation where a user discovers that the document has a wrong direction only after seeing the transmission result. In particular, when the direction of a forwarding image is wrong, it is possible to instantly find out how to correct the set document, thereby easily preventing a scanning error using the multifunctional printer as a scanner. In addition, when a destination is specified in the first screen of FIG. 5, the screen is automatically switched to the second screen of FIG. 7, without an operation by the operator, in order to display the direction of the image displayed by at the destination, according to the direction of the image of the document scanned by document scanner 3b. Accordingly, it is possible to confirm the direction of the image displayed at the destination, immediately after specifying the destination, thereby securely preventing an error in the operation where the document image is forwarded after specifying the destination, without checking the direction of the image.

When the document displaying process is completed, control proceeds to step ST3 of FIG. 3. At step ST3, it is checked whether a start key (SK of FIGS. 7(a) and (b)), for example, located at a separate location from touch panel 6 of the operation panel 5, is pressed. When it is determined that the start key SK has not been pressed, the control proceeds to step ST4. When it is determined that the start key SK has been pressed, the control proceeds to step ST5.

At step ST4, it is checked whether mode key 11 is pressed. This is in consideration of a situation where a mode setting needs to be changed. Since the screen at step ST4 is illustrated in FIG. 7, the controls returns to step ST1 to go back to the destination process mode, when it is determined that mode key 11 is pressed. When it is determined that mode key 11 is not pressed, the control returns to step ST2 to repeat steps ST2 and 3.

Figure 9A:
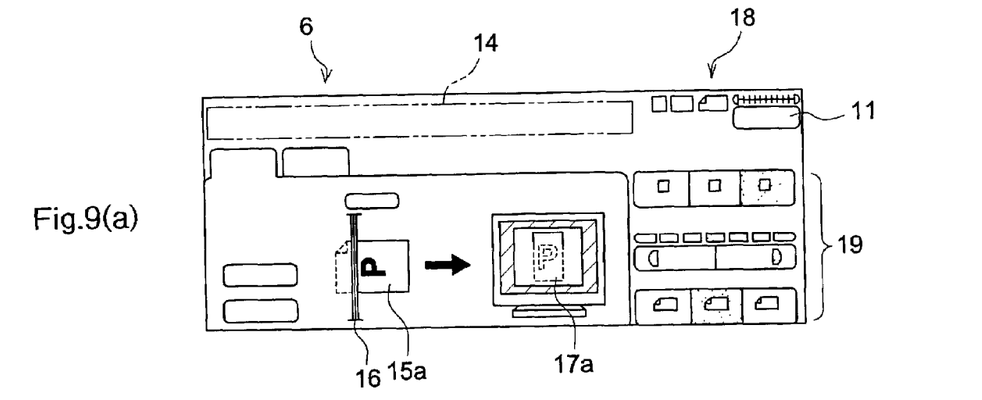
FIG. 9(a) illustrates a state where one third of a document is scanned.
Figure 9B:
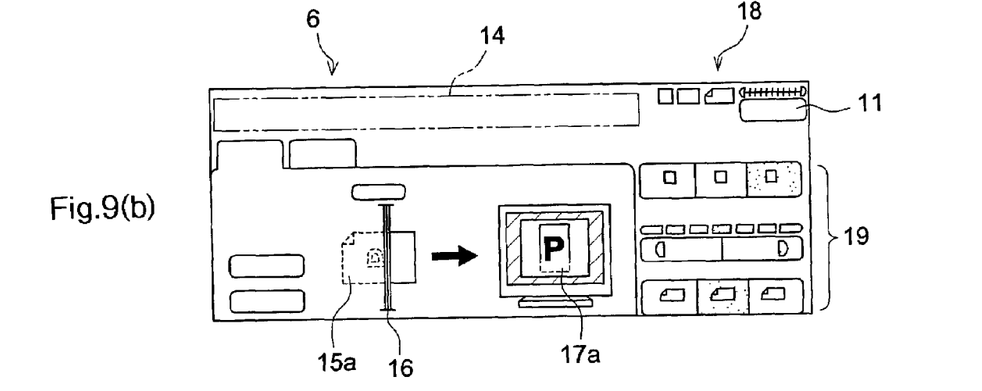
FIG. 9(b) illustrates a state where two thirds of the document is scanned.
Figure 9C:
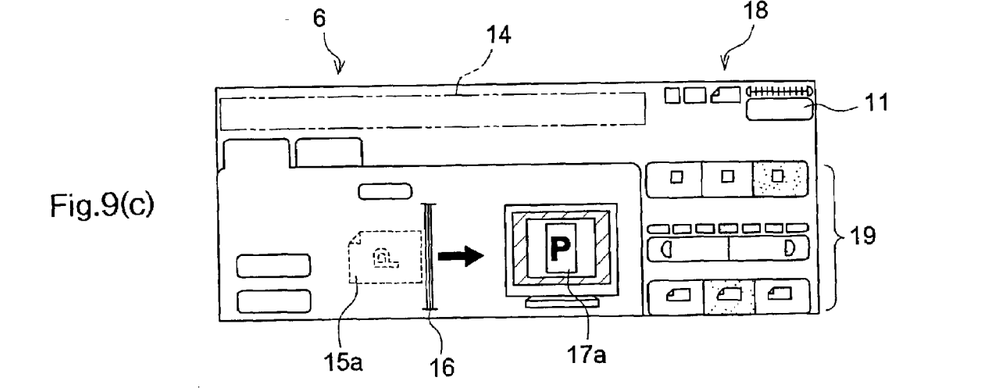
FIG. 9(c) illustrates a state where the entire document is scanned.

At step ST5, a process for forwarding and forwarding status display is performed. When the start key SK is pressed at step ST3, a scanning process is started, and its procedure status is displayed as illustrated in FIG. 9. FIG. 9(*a*) illustrates a state where about one third of a document is scanned. FIG. 9(*b*) illustrates a state where about two thirds of the document is scanned, while FIG. 9(*c*) illustrates a state where the entire document is scanned.

The example in FIG. 9 illustrates a state where scanner head image 16 moves over document image 15*a* according to the scanner procedure status. The scanned part corresponding to document image 15*a* is shown faded. Also, a status of forwarding to a PC is illustrated on a screen of the PC image next to the document image, using forwarding document image 17*a* in a portrait direction, by reflecting the forwarded amount with increased darkened parts in the forwarding image 17*a*. When the document is in the landscape direction, the forwarding image is also displayed in the landscape direction.

Accordingly, since the scanning and forwarding status can be viewed as animation, it is possible to easily determine how the image with confirmed document direction is being forwarded, thereby reassuring the operator. Especially this invention is effective when multifunctional printer 1 and a PC are distantly located from each other.

At step ST6, it is checked whether the forwarding process is completed. When the forwarding process is not complete, the control returns to step ST5 and continues forwarding and displaying the forwarding status. When it is determined that the forwarding process is complete at step ST6, the control returns to step ST1. Since the screen is switched from the forwarding screen of FIG. 9(*c*) (document direction display screen) to the destination screen of FIG. 5, upon completing the forwarding process, the operator is notified about the completion of the forwarding process by the change in the screen itself, and the operator can securely recognize whether the scanned image is still being forwarded or the forwarding process is complete. Since the screen changes upon completing the forwarding process, the operator can securely be notified about when the forwarding process is completed. Also, since it is not necessary to manually switch the screen back to the destination screen upon completing the forwarding process, the operator can immediately proceed to specifying the next destination.

Figure 7A:
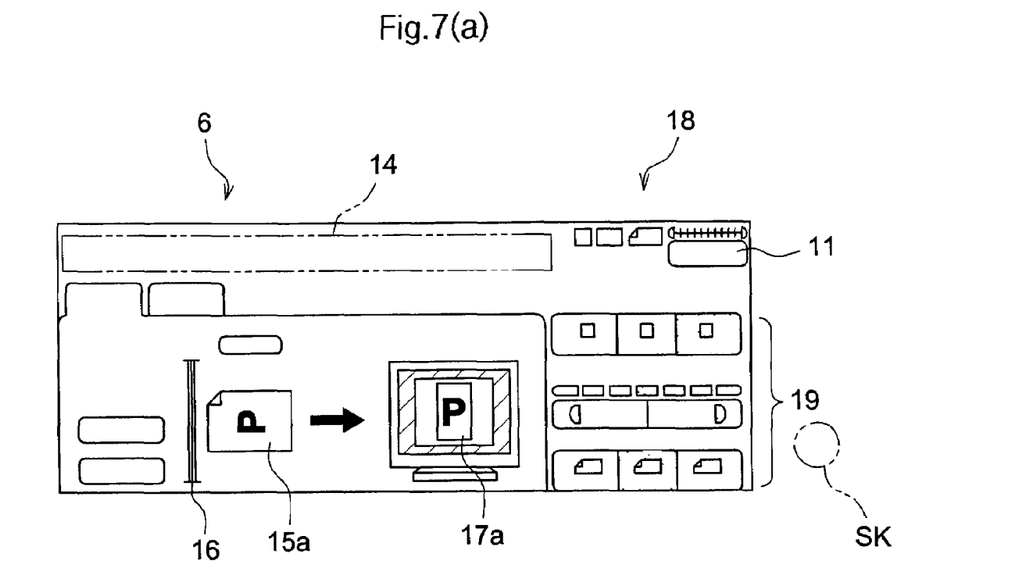
FIG. 7(a) illustrates a display for scanning a document in a portrait direction.

In addition, touch panel 6 screen includes setup content display 18, as illustrated in FIG. 7(*a*), that displays setup contents mode as the third screen, at an upper right corner in the figure. This setup content display 18 constantly displays each setup item set by mode setter 19, which is provided below setup content display 18 in the figure. Setup items can include information such as resolution, character/photograph, and density, and mode setter 19 has switches displayed for setting up the individual setup items. The contents of setup content display 18 can be confirmed by destination specifying screen of FIG. 5, which does not include mode setter 19.

Accordingly, since setup content display 18 displays necessary information (mode setup items) at every screen, it is possible to eliminate the bother of switching the screen whenever the information needs to be confirmed. Also, even when the destination screen of FIG. 5 is opened for specifying a destination, the mode setup status can be confirmed by setup content display 18. Therefore, it is not necessary to switch the screen to the document direction display screen of FIG. 7. When the image can be forwarded to the destination with the displayed mode setup, the destination can be selected at the destination screen, thereby eliminating the bother of confirming the mode, by switching the screen into the document direction display screen.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2002-060549 filed on Mar. 6, 2002, entire content of which is expressly incorporated by reference herein.

What is claimed is:

1. An image scanning apparatus configured to be connected with a destination terminal having a display, the image scanning apparatus comprising:

a scanner that scans a document and obtains image data of the scanned document;

a transmitter that transmits the image data obtained by the scanner to the destination terminal;

a controller that detects that a document is present on said scanner and determines a first orientation, the controller further generates a first image illustrating the first orientation and a second image illustrating a second orientation, the second orientation being based upon the first orientation, the first orientation indicating an orientation direction of the document detected on the scanner, the second orientation indicating a direction of the image data to be displayed on the display of the destination terminal; and a screen configured to display the first image and the second image prior to scanning of the document by said scanner.

2. The image scanner apparatus according to claim 1, further comprising a start key configured to start scanning of the document by said scanner, wherein said scanner scans the document and obtains image data of the scanned document and the transmitter transmits the image data obtained by said scanner to the destination terminal once the start key is operated while the screen displays the first image and the second image.

3. An image scanning apparatus configured to be connected with a destination terminal having a display, the image scanning apparatus comprising:
- a scanner that scans a document and obtains image data;
- a transmitter that transmits the image data obtained by said scanner to the destination terminal;
- a controller that detects that the document is present on the scanner; and
- a screen that displays information to indicate first orientation data and second orientation data prior to scanning of the document by said scanner when a presence of the document is detected by the controller, the first orientation data indicating an orientation direction of the document, the second orientation data indicating an orientation direction of the image data to be displayed on the display of the destination terminal.

4. The image scanning apparatus according to claim 3, further comprising a start key configured to start scanning of the document by said scanner, wherein said scanner scans the document and obtains image data of the scanned document and the transmitter transmits the image data obtained by said scanner to the destination terminal when said start key is operated while the screen displays the first orientation data and the second orientation data.

5. The image scanning apparatus according to claim 4, wherein the information comprises an image indicating the first orientation and an image indicating the second orientation.

6. The image scanning apparatus according to claim 5, wherein said controller determines the orientation of the document present on said scanner and generates the first orientation data and the second orientation data based on the detected orientation.

7. The image scanning apparatus according to claim 5, wherein said screen comprises a touch panel.

8. The image scanning apparatus according to claim 7, wherein the touch panel has a first operational mode and a second operation mode, the first mode being configured to display a destination specifying key associated with the destination terminal and the second mode configured to display the first orientation data and the second orientation data.

9. The image scanning apparatus according to claim 8, wherein said touch panel switches from the first mode to the second mode when said destination specifying key is operated.

10. The image scanning apparatus according to claim 6, wherein the display of the first orientation data and the second orientation data on the screen changes while said transmitter is transmitting the image data to the destination terminal.

11. The image scanning apparatus according to claim 6, wherein said screen is configured with an area to display information relating to a scanning setup.

12. The image scanning apparatus according to claim 6, wherein the document image indicates whether the document positioned on the scanner is in a portrait orientation and the transmission image indicates whether the image data scanned by the scanner is to be displayed on the display of the destination terminal in a portrait orientation.

13. An image scanning apparatus configured to be connected with a destination terminal, the destination terminal having a display, the image scanning apparatus comprising:
- a scanner configured to scan a document and to obtain image data of the scanned document;
- a transmitter configured to transmit the image data obtained by said scanner to the destination terminal;
- a controller configured to detect that a document is present on said scanner and to determine first orientation data; and
- a screen configured to display information to indicate the first orientation data and second orientation data, the first orientation data indicating an orientation direction of the document on the scanner, the second orientation data indicating a direction of the image data to be displayed on the display of the destination terminal.

14. The image scanning apparatus according to claim 13 further comprising a start key configured to start scanning of the document by said scanner, wherein said scanner scans the document and obtains the image data of the scanned document and the transmitter transmits the image data obtained by the scanner to the destination terminal when said start key is actuated while the screen displays the information associated with the first orientation data and with the second orientation data.

15. A method of controlling an image scanning apparatus that is configured to be connected with a destination terminal, the destination terminal having a display, the image scanning apparatus including a scanner that scans a document and obtains image data of the scanned document, a transmitter that transmits the image data obtained by the scanner, a screen and a start key, the method comprising:
- detecting a presence of the document on the scanner;
- determining an orientation of the document on the scanner;
- generating a first image illustrating first orientation data and a second image illustrating second orientation data, the second orientation data being based on the first orientation data, the first orientation data, based on the determined orientation of the document on the scanner, indicating an orientation direction of the document on the scanner, the second orientation data indicating an orientation direction of the image data to be displayed on the display of the destination terminal;
- displaying the first image and the second image on the screen;
- scanning the document positioned on the scanner and obtaining the image data, when the start key is operated while the first image and the second image are displayed on the screen; and
- transmitting the obtained image data to the destination terminal.

16. A controller for use in an image scanning apparatus and configured to be connected with a destination terminal having a display, the image scanning apparatus including a scanner that scans a document and obtains image data of the scanned document and a transmitter that transmits the image data obtained by the scanner to the destination terminal, the controller comprising:
- a detector configured to detect a presence of the document on the scanner;
- a determiner configured to determine a first orientation and to generate a first image illustrating the first orientation and a second image illustrating a second orientation, the second orientation being based on the first orientation, the first orientation indicating an orientation direction of the document positioned on the scanner, the second orientation indicating a direction of image data to be displayed on the display of the destination terminal; and
- a screen controller configured to control a screen of the image scanning apparatus to display the first image and the second image prior to scanning of the document by said scanner.

* * * * *